United States Patent

[11] 3,555,328

| [72] | Inventor | William P. Hunsdorf |
| | | P.O. Box 535, Riverview, Fla. 33569 |
| [21] | Appl. No. | 824,786 |
| [22] | Filed | May 15, 1969 |
| [45] | Patented | Jan. 12, 1971 |

[54] DC MOTOR WITH ROTATING BRUSH HOLDER
3 Claims, 3 Drawing Figs.

[52] U.S. Cl. .................................................. 310/177,
310/181, 310/239
[51] Int. Cl. ..................................................... H02k 31/00
[50] Field of Search .......................................... 310/177,
128, 130, 219, 224, 231, 49, 132—135, 233—237,
206, 239; 336/177; 318/No Search; 322/No Search

[56] References Cited
UNITED STATES PATENTS

| 257,999 | 5/1882 | Ball .............................. | 310/267 |
| 1,224,160 | 5/1917 | Girvin ........................... | 310/177 |
| 1,624,254 | 4/1927 | Kostenko ...................... | 310/177 |
| 1,745,961 | 2/1930 | Tanner .......................... | 310/148 |
| 2,629,075 | 2/1953 | Deschmann ................... | 310/241 |
| 2,812,454 | 11/1957 | Buck ............................. | 310/154 |
| 3,233,587 | 2/1966 | Morton ......................... | 336/177 |
| 3,381,193 | 4/1968 | Smith ............................ | 310/49 |

Primary Examiner—Milton O. Hirshfield
Assistant Examiner—R. Skudy
Attorney—Oberlin, Maky, Donnelly and Renner ABSTRACT: A DC motor having a ring stator slotted on the inside and outside surfaces to receive insulated square iron wire windings to form a stationary armature, the windings being connected at a plurality of taps thereon to a stationary commutator for creation of a rotating magnetic field. A rotating brush holder, driven by an external motor cooperates with the stationary commutator to effect the rotating magnetic field, DC voltage being applied to the brushes by way of a slip ring arrangement. A bipolar field structure is rotatably mounted inside the armature ring and is continuously energized in one polarity for reaction with the armature by another slip ring and brush arrangement.

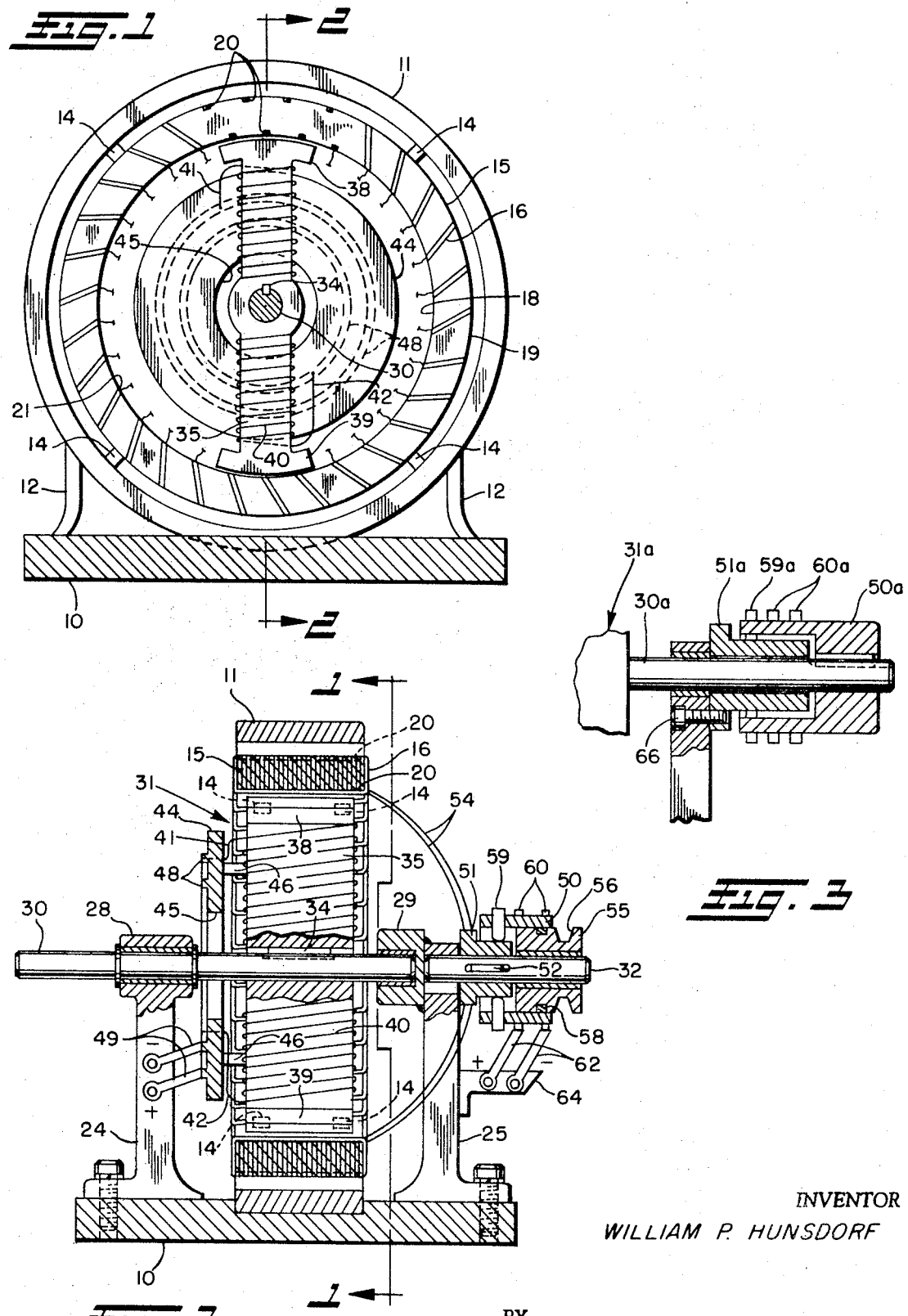

DC MOTOR WITH ROTATING BRUSH HOLDER

This invention relates generally to electric motors and more particularly to a new design of DC motor employing a novel relation between armature and field windings wherein the armature is wound about a ring core while the field winding is adapted for rotation within the ring.

It has been common in the past to consider the rotating part of a DC motor as the armature having windings thereon connected to a commutator which is adapted for rotation together with the armature. The commutator, in turn, cooperates with a fixed brush arrangement which supplies electric energy for energizing the armature windings. In such arrangement it is common to have a two pole field structure which is continually energized by a source of DC power to provide stationary magnetic poles within the frame of the machine and against which reaction occurs to provide rotation of the armature. In such machine the armature mass forms a portion of the magnetic circuit, being a structure formed of soft iron and positioned between the field poles. It is well known that such structure must be of laminated construction in order to achieve suitable operating characteristics to prevent eddy current losses due to the movement of the structure in a magnetic field.

Further, it is known that in the case of a copper wound armature a counter e.m.f., is created in the armature dependent in amplitude on the speed of a rotation of the motor. This counter e.m.f., acts to buck the voltage applied directly to the armature and thereby affects the output torque of the motor. An armature wound with iron wire does not create near the back e.m.f., as the copper wound armature and significantly different operating characteristics are achieved. Further variations in the magnetic field characteristics between the field and armature windings are noted when an inverted disposition of such windings is effected and significant variations in operating efficiencies are realized.

Therefore, it is one object of this invention to provide a new type of DC motor which employs a ring-shaped armature disposed about a rotatable field rotor structure and which provides substantially constant torque output at any speed or rotation.

It is another object of this invention to provide a new type of DC motor having a stationary winding on an outer ring structure which creates a rotating magnetic field by the cooperation of a stationary commutator and rotating brush holder arrangement.

It is another object of this invention to provide a new type of DC motor which is more efficient than previous designs at any speed of the rotating brush holder and which is adapted for connection in a series or parallel arrangement of the armature and field windings.

In the drawings:

FIG. 1 is an end view partly in cross section and with parts broken away of the motor of this invention;

FIG. 2 is a cross-sectional side view of the motor showing the preferred location and interconnection of components; and FIG. 3 is a partial cross-sectional view of a second embodiment of the invention sharing a single shaft construction.

Referring now to FIG. 1, the motor of this invention comprises a base or platform 10 having mounted thereon a ring 11 of relatively short axial extent forming the frame of the motor, additional support between the frame 11 and the platform 10 being provided by the arcuate standards 12. Concentrically disposed within the frame 11 and supported therein by a plurality of nonmagnetic spacers 14 is another ring structure 15 of axial extent approximately equal to that of the frame 11 forming the core for the stator winding 16. The ring core 15 is of laminated construction comprising the typical laminations which are on the order of one sixty-fourth of an inch in thickness to prevent the generation of excessive eddy currents caused by varying magnetic fields in the manner well understood in the art. Wound about the core 15 are a number of evenly spaced turns of wire forming the stator winding 16 for the motor. The inner and outer peripheral surfaces 18, 19 of the core 15 contain generally axially extending slots 20 for receipt of the stator winding 16 and preferably such slots 20 are of a dimension to receive iron wire of essentially square cross section to present substantially continuous inner and outer peripheral surfaces 18, 19.

While the number of turns of iron wire on the stator structure 15 is only schematically shown in the drawings, it will be apparent that a sufficient number of turns are required to achieve a substantial magnetic field in the adjacent the core structure 15. This is dependent on the number of turns and the current flowing through the turns, both readily designed by one skilled in this art. The turns of the stator winding 16 are tapped equally about the periphery of the core 15, indicated in FIG. 1 at every turn as at 21; however, it will be appreciated that a greater number of turns can occur between each tap 21 forming some variation in the magnetic field, but still within the teachings of this invention.

Mounted also on the platform 10 at axially spaced locations are first and second standards 24, 25 supporting at their upper portions, axially aligned bushings or bearings 28, 29. The bearings 28, 29 of the first and second standards 24, 25 receive the drive shaft 30 of the rotor structure 31 while the second standard 25 supports a stub shaft 32 in cantilever configuration. Mounted on the drive shaft 30 and secured thereto by means of a key 34 is a generally rectangular iron bar 35 forming the core of the rotor structure 31, extending substantially the full diameter of the ring 15 and having pole pieces 38, 39 at either end of arcuate configuration closely spaced to the ring 15. A single layer of iron wire 40 circumscribes the length of the rotor bar 35 terminating in first and second lead in wires 41, 42, respectively.

An insulated disc 44 having a central aperture 45 is mounted on the rotor bar 35 by means of a pair of standards 46 on either leg thereof and the left-hand surface of the disc, as viewed in FIG. 2, bears a pair of concentric rings 48 of conductive material forming the slip rings for the rotor structure 31. The terminating leads 41, 42 of the field winding 40 are connected to the pair of rings 48 of conductive material and a pair of brushes 49 are insulatively mounted on the first standard 24 for cooperation with the rings 48, maintaining contact therewith throughout the full rotation of the rotor structure 31. A DC voltage form an external source (not shown) is applied to the brushes 49 in the polarity indicated to supply continuous energization to the field winding 40 of the motor.

The stub shaft 32 mounted in the second standard 25 is adapted for support of a rotating brush holder 50 and commutator 51 arrangement for energizing the stationary stator 16 of the motor. Mounted on the shaft 32 is the commutator 51 of the voltage distributing arrangement comprising the usual cylindrical insulative member fixed to the shaft 32 by key 52 to prevent rotation with respect thereto. On the outer periphery of the commutator 51 are a plurality of conductive segments, each extending, typically, only a portion of the circumference of the commutator 51 and connected individually to the taps 21 of the stator winding 16 by means of connecting wires 54.

Further mounted on the shaft 32 outboard of the commutator 51 is the rotating brush holder 50 and drive pulley 51 is arrangement. The pulley 55 is of the conventional V belt type, having the V-notch in the outer portion thereof for communication with a drive motor by way of a connecting V belt (not shown). On the inner portion of the pulley 55 and secured for rotation therewith by means of weldments or the like is a ring 58 of nonconductive material for support of the stator brushes 59 and slip rings 60.

As indicated in FIG. 2, the brushes 59 are mounted in a radial direction with respect to the ring 58 for sliding contact with the peripheral arrangement of conductive segments on the commutator 51. The slip rings 60 are further mounted on the ring 58 and comprise complete rings of conductive material bonded on the rotating brush holder 50 for movement therewith in an insulated manner.

The upper of the brushes 59 as viewed in FIG. 2, is connected to one of the conductive rings 60 while the lower of the brushes 59 is connected to the second of the conductive rings 60, and the rings 60 in turn cooperate with a further fixed brush arrangement 62 insulatively mounted on an outrigger 64 on the second standard 25 for continuous energization of the stator 16 of the motor. As indicated, a source of DC potential is applied to the brushes 62 in the polarity indicated and such source may be the same source utilized for energization of the rotor 31 at brushes 49.

It will be appreciated then that the rotating brush holder 50 and commutator 51 serve to establish a rotating magnetic field in the stator core structure 15 to effect reaction with the rotor member 31 located internally thereof. As viewed in FIG. 1, the brush holder 50 is effective to connect diametrically opposed taps 21 on the stator winding 16 to opposite potentials from the power source such that two separate paths of current flow are established in the stator winding 16, i.e., opposite halves of the winding, to create a relatively strong bipolar configuration for reaction with the rotor structure 31. The continuous winding of the stator 16 is known as the Gramme ring winding and the opposing configuration of the winding on either half of the stator core 15 together with the opposing direction of flow of current in either half serve to reinforce the magnetic field effect to provide a relatively strong North-South pole magnetic field arrangement with a minimum of current flow.

It will be appreciated that as the brush holder 50 is rotated to a new position a succeeding pair of taps 21 on the stator winding 16 will be contacted by the brushes 59 thereby moving the effective magnetic poles to a new position slightly displaced from the previous and in cumulative effect creating a continuous rotation of the magnetic poles of the motor in the stator core 15.

The rotor structure 31, being so soft iron construction and being continually energized from the power source via slip rings 48 will effect a continuous North-South pole magnetic field configuration which will remain unchanged in strength but which will be rotated within the confines of the stator ring 15 during operation of the motor.

Thus be conventional analysis of magnetic field patterns will be appreciated that, for example, at one instant of time, a North pole will be created at the upper portion of the rotor bar 35 as viewed in FIG. 1 for cooperation with an effective South pole of the stator winding 16 having a maximum magnetic intensity at some position displaced from the instantaneous position of the rotor bar 35. As the rotating brush holder 50 is brought up to speed it will be clear that the rotor 31 will undergo a coglike initial acceleration depending upon the fineness of the taps 21 on the stator winding 16 and the load characteristics imposed upon the motor. Under normal operating conditions, however, a relatively smooth operation will be realized save for only at a very minimal speed where the cogging action may be noticeable.

It will be understood also that the relationship between an induced magnetic field in the stator structure 16 and the instantaneous position of the rotor structure 31 may be varied to some extent by several of the factors affecting the motors operating characteristics. For example, it might be expected that a maximum output of the motor would be realized when the stator 16 magnetic pole and that of the rotor 31 are of opposite polarity and closely adjacent one another, a condition that might be obtained at the nominal running speed. It should be realized, however, that the torque output of the motor will be substantially constant for any speed of rotation of the brush holder 50 in that the maximum output will be obtained whenever there is a close coupling between the magnetic fields of the relatively moving portions of the motor.

In a variation of the system as shown in FIG. 3, the rotatable brush holder 50a may be adapted to be supported on and rotated by the shaft 30a supporting the rotor structure 31a so that a fixed relationship obtains between the position of the brushes 59a in the brush holder 50a and the alignment of the rotor structure 31a. By this expedient an optimum location for the stator magnetic field with respect to the rotor structure 31a may be realized resulting in a maximum torque output and linear operation for the motor at any speed of rotation and obviating the necessity for an auxiliary motor for driving the rotating brush holder 50a. In this instance the rotor 31a and stator windings may, as in the first embodiment, be connected either serially or in parallel and substantially the same result would be obtained. It is clear in this embodiment that the commutator 51a is still retained stationary, as by the bolt 66, and that the brush holder 50a requires no pulley. It is possible also instead of the direct coupling by shaft 30a, to employ some form of speed changer to alter the velocity of the brush holder 50a with respect to the velocity of the rotor 31a.

Further, only a two pole machine has been shown and it is obvious that the teachings of this invention may be extended to four or more poles requiring a commensurate complexity increase in the commutator 51 and brush holder 50 construction whereby respective sets of brushes are instantaneously oriented with respect to the different poles of the rotor and stator structure. Such techniques are well understood in the art of direct current motors and require no detailed explanation.

As noted, the stator winding 16 is formed in axially extending slots 20 in the stator core 15 and iron wire of essentially square cross section is utilized. The resistance of the iron wire is much greater than that of copper wire and thus the slots 20 must be substantially larger. Further, the iron wire substantially fills the slots 20 with a material similar to that of the core 15 resulting in minimum disruption of the magnetic path.

This configuration of motor assures that little or no counter electromotive force will be generated in the stator winding 16, due to traverses of the magnetic field of the moving rotor 31, to oppose the stator current, so that essentially constant current is drawn at any speed of rotation.

I claim:

1. A DC motor, comprising a frame, a ring of magnetically permeable material supported in said frame, said ring having a plurality of circumferentially spaced slots therein, a first winding of iron wire wound on said ring to form the armature of the motor, said first winding substantially filling said slots and having a plurality of taps for energization of the armature, a shaft supported for rotation in said frame, a rotor of magnetically permeable material fixedly mounted on said shaft for rotation therewith, said rotor being of extended length and having ends adjacent the inner periphery of said ring, a second winding of conductive wire on said rotor, a brush and slip ring arrangement operatively connected to said second winding for continuous energization of same, to create magnetic poles at the ends of said rotor, a commutator fixedly mounted on said frame, said commutator having segments in electrical connection with the taps of said first winding, a brush holder rotatably mounted on said frame, having brushes in operative relation to said commutator, means for continuously energizing said brushes, and means for rotating said brush holder to create a rotating magnetic field in said first winding and rotation of said shaft.

2. A DC motor as set forth in claim 1 wherein said brush and slip ring arrangement for energizing said second winding comprises a disc supported on said rotor for rotation therewith, a pair of concentric conductive rings on said disc electrically connected with said second winding, and a pair of brushes insulatively mounted on said frame and in engagement with said rings.

3. A DC motor as set forth in claim 2 wherein said brush holder is mounted on said shaft for rotation therewith, said brush holder having a pair of slip rings mounted on the periphery thereof for continuous energization of said brushes carried thereby from a source of DC power.